United States Patent [19]

Beier et al.

[11] Patent Number: 5,896,191
[45] Date of Patent: Apr. 20, 1999

[54] REINFORCED ELASTOMER PANEL WITH EMBEDDED STRAIN AND PRESSURE SENSORS

[75] Inventors: Theodor Harry Beier, St. Louis; John Martin Haake; Robert Henry Wille, both of St. Charles, all of Mo.; Jack Howard Jacobs, Glendale, Ariz.

[73] Assignee: McDonnell Douglas

[21] Appl. No.: 08/854,954

[22] Filed: May 13, 1997

[51] Int. Cl.⁶ .................................................. G01B 5/02
[52] U.S. Cl. .................. 356/35.5; 356/72; 356/345; 356/352; 250/227.16; 250/227.19; 73/802
[58] Field of Search .............................. 356/32, 33, 35.5, 356/72, 345, 352; 250/227.14, 227.16, 227.19, 227.27; 73/800, 802; 385/12, 14

[56] References Cited

U.S. PATENT DOCUMENTS

| | | | |
|---|---|---|---|
| 4,734,577 | 3/1988 | Szuchy | 356/32 |
| 4,781,056 | 11/1988 | Noel et al. | 356/32 |
| 5,222,699 | 6/1993 | Albach et al. | 244/213 |
| 5,361,130 | 11/1994 | Kersey et al. | 356/345 |
| 5,392,117 | 2/1995 | Belleville et al. | 356/352 |
| 5,638,165 | 6/1997 | Duke et al. | 356/32 |

OTHER PUBLICATIONS

C. R. Fuller, C. Guigou, and C. A. Gentry, *Foam–PVDF smart Skin For Active Control of Sound*, Apr. 1996, SPIE vol. 2721, pp. 26–37.

Hugh B. Denham, Todd A. Anderson, Erdogan Madenci and Paul Calvert,*Embedded PVF2 Sensors for Smart Composites*, 97, SPIE vol. 3040, pp. 138–143.

Darryll J. Pines, *Hybrid Distributed Modal/Wave Sensors for Structural Control*, SPIE vol. 2717, pp. 462–471.

*Primary Examiner*—Samuel A. Turner
*Attorney, Agent, or Firm*—Dale B. Halling

[57] ABSTRACT

A sensor system for a reinforced elastomer panel (100) has an optical source (104) emitting an optical signal. An optical strain sensor (102) is embedded in an elastomer sheet (40) of the reinforced elastomer panel (100) and receives the optical signal. A strain processing system (108) is optical coupled to the optically strain sensor (102).

21 Claims, 6 Drawing Sheets

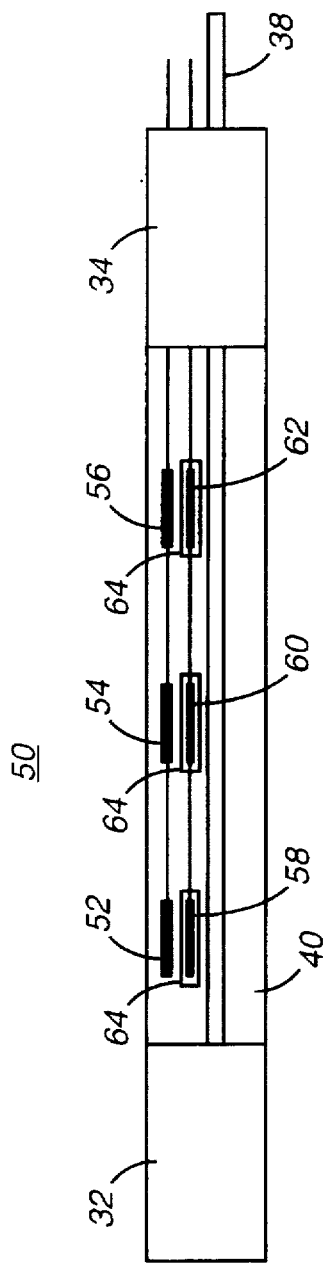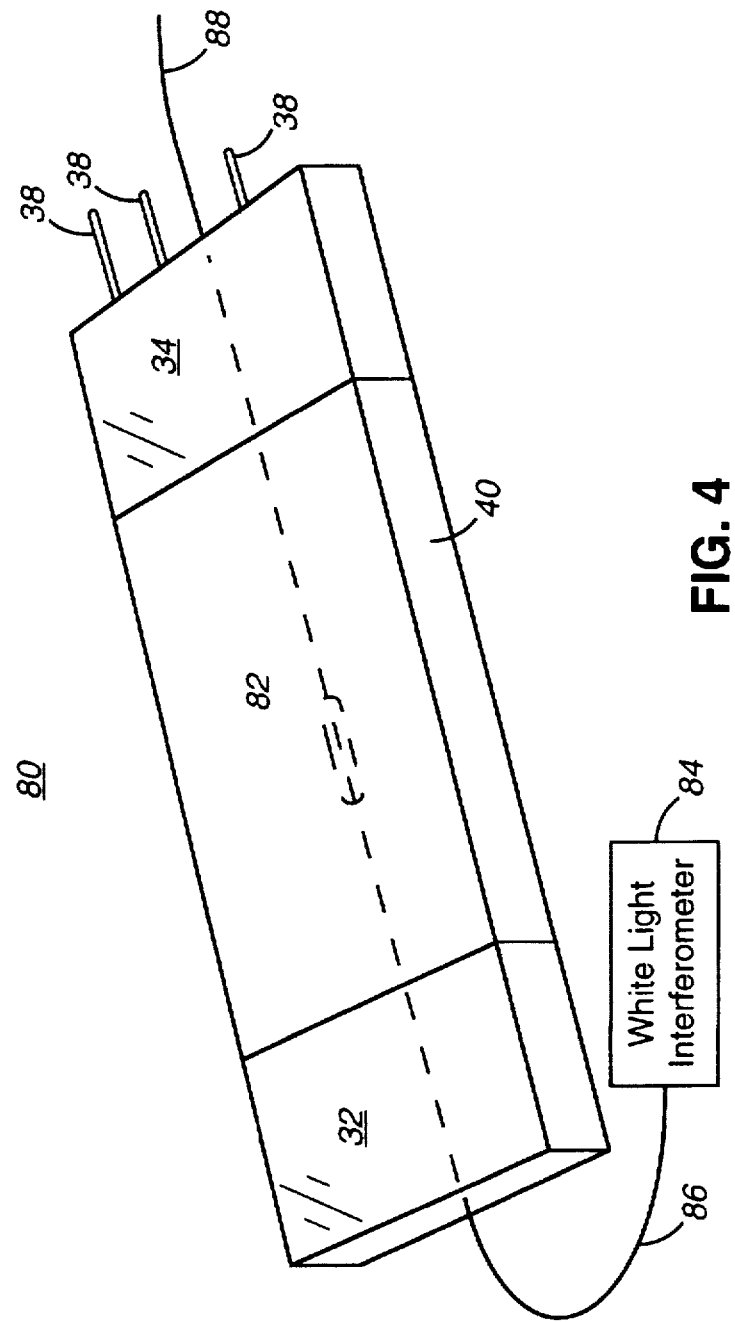

REINFORCED ELASTOMER PANEL WITH EMBEDDED STRAIN AND PRESSURE SENSORS

FIELD OF THE INVENTION

The present invention relates generally to the field of elastomer panels and more particularly to a sensor system for an elastomer panel.

BACKGROUND OF THE INVENTION

Elastomeric surfaces have the potential to significantly reduce the aerodynamic drag due to gaps in control surfaces. In addition, elastomeric surfaces allow new control surfaces to be formed on modern aircraft. Unfortunately, present day sensing systems, such as pitot tubes, require gaps in the aircraft's surface and create drag. Present sen systems are not adapted to determine the position of these advanced control surfaces and do not take advantage of the opportunities for new aircraft sensing systems afforded by elastomeric surfaces.

Thus there exists a need for a sensing system that is designed for these new elastomeric control surfaces and does not create additional aerodyamic drag.

SUMMARY OF THE INVENTION

A sensor system for a reinforced elastomer panel that overcomes these and other problems has an optical source emitting an optical signal. An optical strain sensor is embedded in an elastomer sheet of the reinforced elastomer panel and receives the optical signal. A strain processing system is optical coupled to the optically strain sensor.

BRIEF DESCRIPTION OF THE DRAWINGS

FIG. 3 is a side view of a reinforced elastomer panel with a plurality of pressure sensors;

FIG. 4 is a perspective view of a reinforced elastomer panel with an optical strain sensor;

DETAILED DESCRIPTION OF THE DRAWINGS

Figure 1:
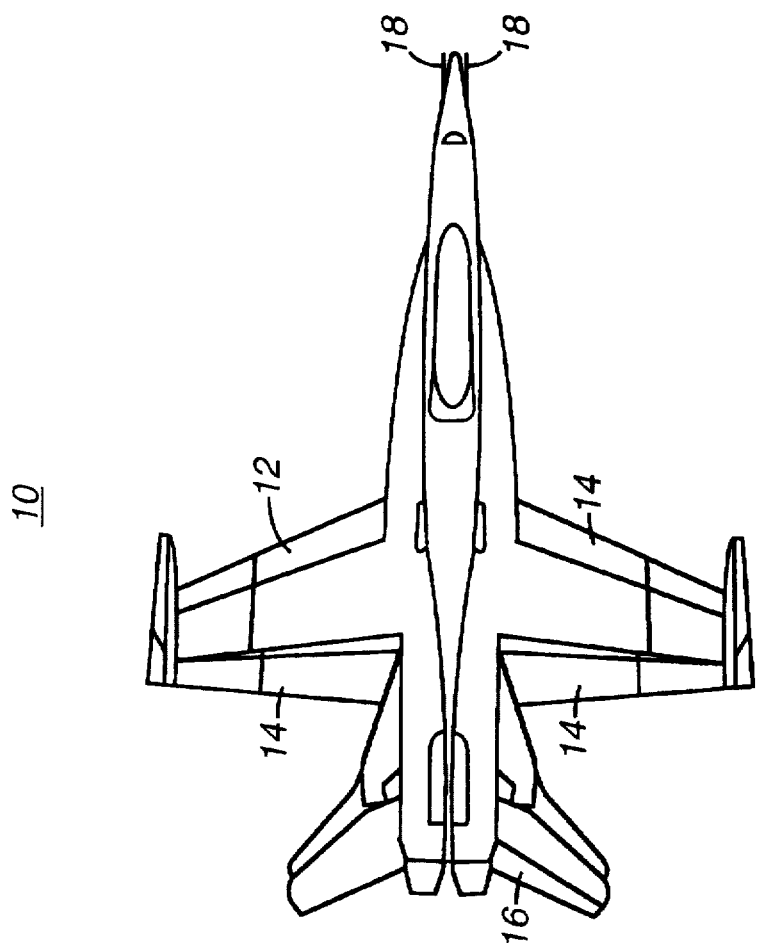
FIG. 1 is a top view of a modern aircraft.

Modern aircraft 10 (see FIG. 1) have a wide variety of control surfaces 12–16, that can take advantage of elastomer panels to eliminate gaps and the aerodyamic spillage and drag resulting from the gaps. In addition, new flexible control surfaces can be implemented using elastomeric surfaces. Present day aircraft have pitot tubes 18 to measure airspeed, by measuring the local air pressure. By using groups of pilot tubes, placed strategically around control surfaces, total pressure, angle of attack and angle of sideslip can be determined.

Figure 2:
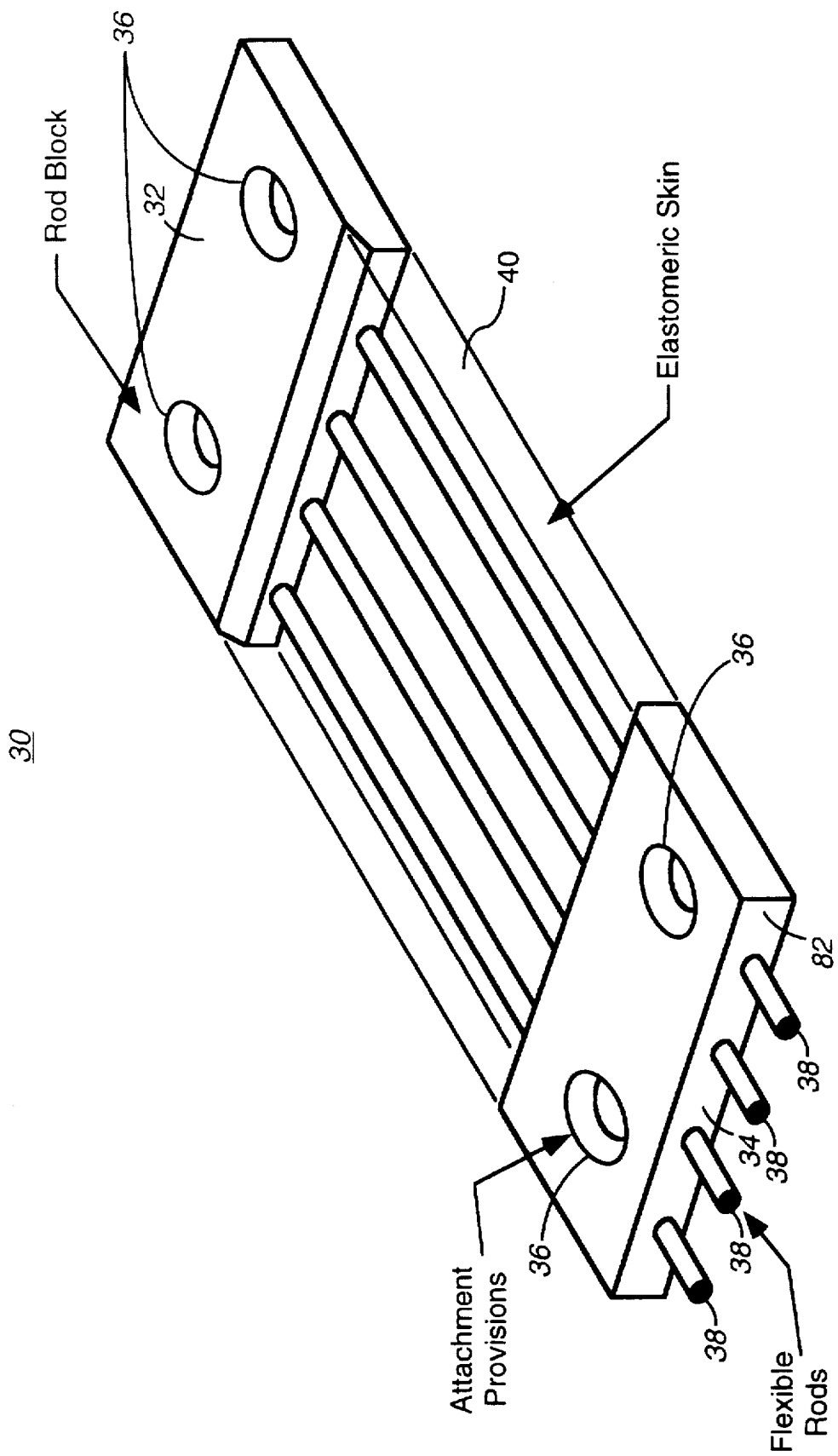
FIG. 2 is a perspective view of a reinforced elastomer panel.

FIG. 2 is a perspective view of a reinforced elastomer panel 30 used to eliminate gaps and create new control surfaces. The reinforced elastomer panel 30 has a pair of rod blocks 32, 34 having attachment provisions 36. The rod blocks are attached to either side of a gap and the reinforced elastomer panel 30 then provides a smooth curvilinear surface over the range of motion for the control surface. A plurality of rods (reinforcing members) 38 are attached to the first rod block 32 and are allowed to slide freely through the second rod block 34. The rods are made of a flexible material such as quartz filled epoxy. An elastomer panel (elastomer skin) 40 is connected between the pair of rod blocks 32, 34. The plurality of rods 38 are allowed to slide freely through the elastomer panel 40. The elastomer panel 40 in one embodiment is made of silicone.

FIG. 3 is a side view of a reinforced elastomer panel 50 having a plurality of pressure sensors 52–56. The plurality of pressure sensors 52–56 are embedded in the elastomer skin 40. The elastomer skin 40 being flexible transmits the outside air pressure to the pressure sensors 52–56. In one embodiment the pressure sensors 52–56 are piezoelectric transducers. In one embodiment, the piezoelectric transducers are Poly Vinylidine Flouride (PVDF) sensor arrays. These sensors can be easily embedded within the elastomer skin 40, are low cost, and require minimal electrical circuitry. Commonly, these PVDF sensors are used in pairs. The second PVDF sensor 58–62 are used to adjust for thermal effects on the pressure sensor 52–56. The second PVDF sensors 58–62 are encased in a rigid structure 64 to prevent them from sensing the pressure variations. By strategically placing the elastomer panels 50 around a control surface, the pressure sensors 52–58 can replace pitot tubes and make all the measurements presently made with pitot tubes. Unlike pitot tubes, the pressure sensors 52–58 do not result in gaps and do not project out from the moldline of the aircraft, as a result they do not create aerodynamic drag.

FIG. 4 is a perspective view of an embodiment of a strain sensor and measuring system for a reinforced elastomer panel 80. The optical strain sensor 82 is embedded in the elastomer skin 40 of the reinforced elastomer panel 80. The optical strain sensor 82 is coupled to an optical strain demodulator system (optical strain processing system) 84 by an optical fiber 86. In one embodiment, the optical strain sensor 82 is a Fabry-Perot interferomter and the optical demodulator system 84 includes a white light interferometer. In another embodiment the strain sensor is a Bragg grating and the optical demodulator includes a coherent light interferometer. Other embodiments will be obvious to those skilled in the art and are consider part of the present invention. The optical fiber is terminated 88 at the end opposite the optical strain demodulator system 84. The strain level is then correlated to a position (shape) of the elastomer panel 80.

Figure 5:
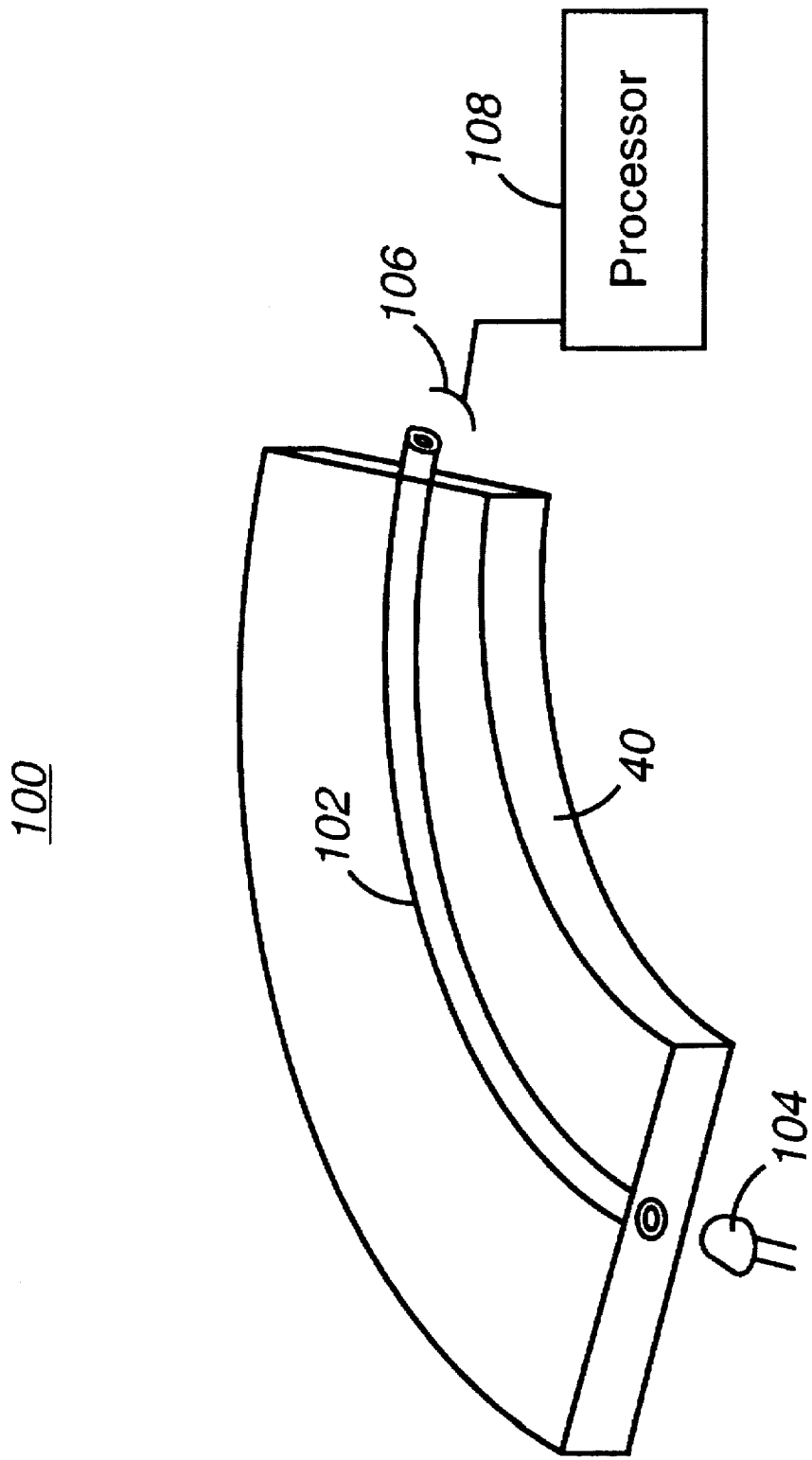
FIG. 5 is a perspective view of an elastomer panel with another embodiment of an optical strain sensor.

FIG. 5 is a perspective view of another embodiment of an elastomer panel 100 with an optical strain sensor. In this embodiment an optical fiber 102 is embedded in the elastomer panel 100 and is an optical sensor. An optical source 104 emits an optical signal that is altered by the optical strain sensor 102. A detector 104 receives the optical signal and a processor (optical strain processing system) 108 relates the received signal to a strain level. In this embodiment the strain on the optical fiber 102 results in the optical signal escaping from the optical fiber 102. As a result, the amount of light received at the detector 106 is directly proportional to the strain or bend of the optical fiber 102. In one embodiment, the optical source 104 is a light emitting diode (LED) and the optical fiber is made of silicone. Because the elastomer panel 100 is also made of silicone, the optical fiber can be formed within the elastomer panel.

Figure 6:
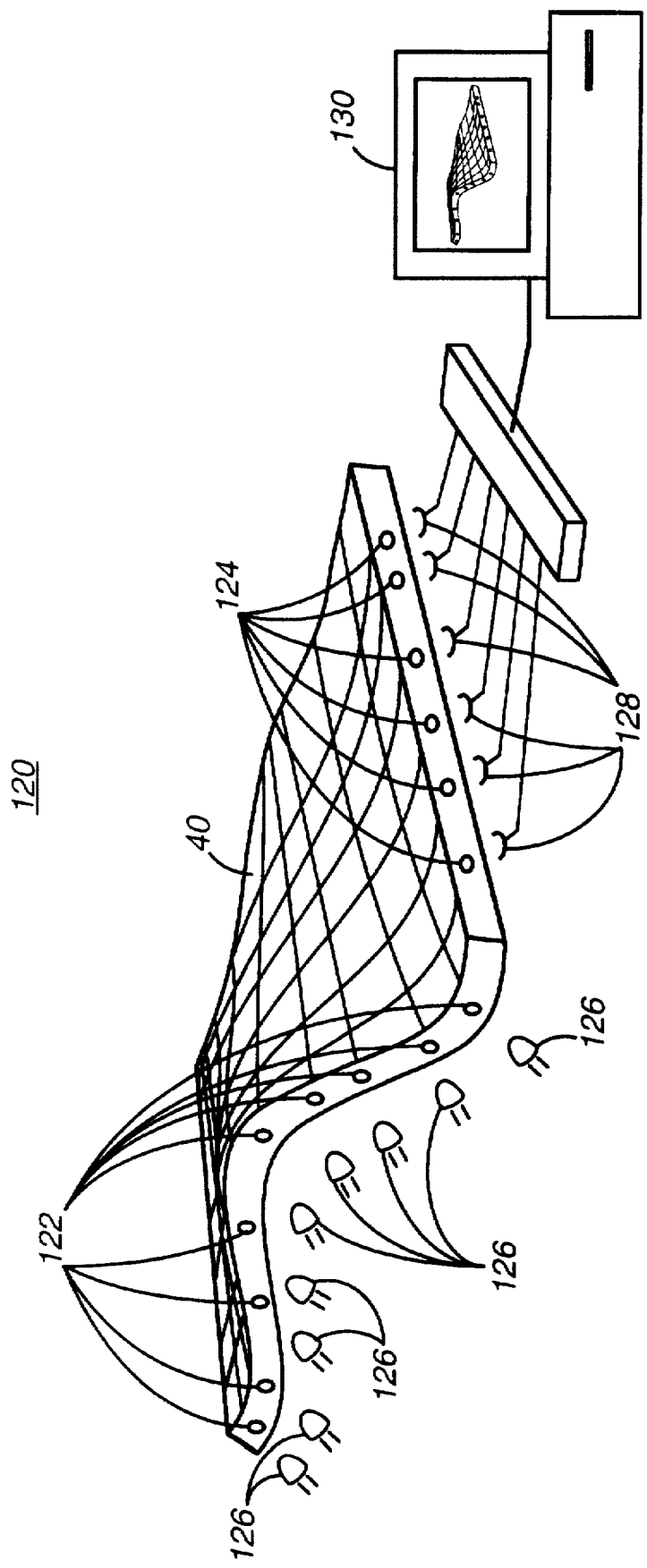
FIG. 6 is a perspective view of an elastomer panel with another embodiment of an optical strain sensor.

FIG. 6 is a perspective view of another embodiment of an elastomer panel 120 with an optical strain sensor. In this embodiment a matrix of optical fibers 122, 124 are embedded in the elastomer skin 40. The source optical fibers 122 are placed near the sensing optical fibers 124. As the elastomer skin 40 is elongated or bent, the source and sensing fibers move closer (or farther) apart. As a result the amount of optical coupling at each intersection is dependent on strain near the intersection. A plurality of optical sources 126 are coupled to the source optical fibers 122. A plurality of optical detectors 128 receive the coupled optical signal. By sequentially turning on the optical sources 126, the strain at each of the intersections can be related to the received optical power at each of the detectors 128. The detectors 128 are coupled to a processing system 130, shown as a computer in this case, that converts the received optical levels to the shape of the elastomer panel 40. Complex control surfaces formed using elastomer panels with these sensors can be monitored to determine the exact deformation.

Figure 7:
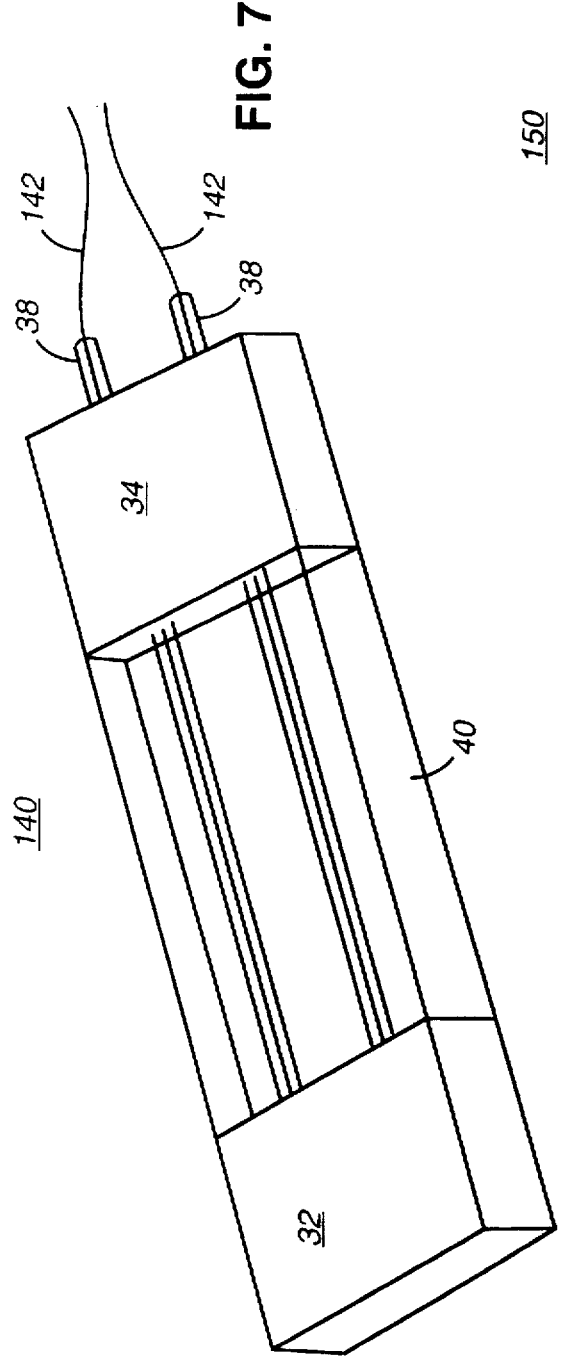
FIG. 7 is a perspective view of an elastomer panel with a rod integrity sensor.

FIG. 7 is a perspective view of a reinforced elastomer panel 140 with a rod integrity sensor 142. The reinforcing rods 38 can break after extended use. Knowing that a reinforcing rod has broken allows it to be replaced before it can damage the elastomer panel and effect the performance of the elastomer panel 140. As a result crack wires 142 are deposited on the reinforcing member 38. An electrical continuity check can be performed on the crack wires to determine if a crack has developed in any of the rods 38.

Figure 8:
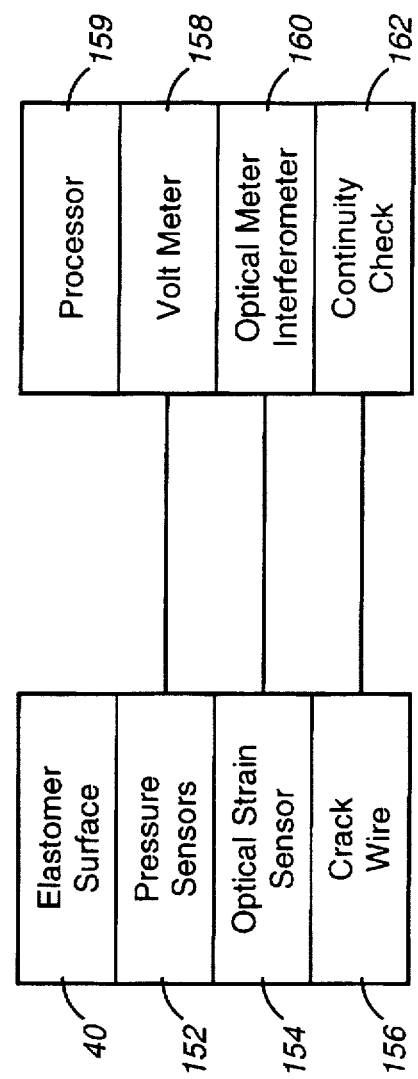
FIG. 8 is a block diagram of an integrated sensing system for an elastomer panel.

FIG. 8 is a block diagram of an integrated sensing system 150 for an elastomer panel. The elastomer surface (skin) 40 has embedded pressure sensors 152, optical strain sensors 154 and crack wires 156 on the reinforcing members. A voltmeter 158 is used to measure the pressure sensed by the pressure sensors 152. This information is then passed to a processor 159 to convert the sensed voltages to pressures, airspeed, angle of attack, etc. An optical meter or an interferometer 160 monitors the optical strain sensor 154 and converts the sensor output to a signal proportional to the strain. The processor 159 converts the strain to a shape of the elastomer surface 40. An electrical continuity checker 162 determines if any of the reinforcing members are broken. The processor 159, voltmeter 158, optical meter/interferomter 160 and continuity checker 162 form the electronic processing circuit.

Thus there has been described a sensing system for an elastomer panel (aircraft) that does not create drag, provides control surface position feedback, and replaces pitot tubes. While the invention has been described in conjunction with specific embodiments thereof, it is evident that needy alterations, modifications, and variations will be apparent to those skilled in the art in light of the foregoing description. Accordingly, it is intended to embrace all such alterations, modifications, and variations in the appended claims.

What is claimed is:

1. A sensor system for a reinforced elastomer panel, comprises:

a pair of rod blocks;

a plurality of reinforcing members attached to one of the pair of rod blocks and sliding freely through a second of the pair of rod blocks, the plurality of reinforcing members substantially parallel to each other;

an elastomer sheet connected between the pair of rod blocks, the plurality of reinforcing members sliding freely inside the elastomer sheet;

an optical source emitting an optical signal;

an optical strain sensor embedded in the elastomer sheet of the reinforced elastomer panel, receiving the optical signal; and a strain processing system optically coupled to the optical strain sensor, wherein a shape of the reinforced elastomer panel is determined based on a strain level.

2. The sensor system of claim 1, wherein the optical strain sensor is a Fabry-Perot interferometer.

3. The sensor system of claim 2, wherein the strain processing system includes an interferometer.

4. The sensor system of claim 1, wherein the optical strain sensor is a matrix of optical fibers.

5. The sensor system of claim 4, wherein the strain processing system includes an optical energy detector.

6. The sensor system of claim 1, further including a pressure sensor encased in an elastomer sheet of the elastomer panel and capable of measuring an outside air pressure.

7. The sensor system of claim 1, further including a crack wire deposited on a reinforcing member of the elastomer panel.

8. A sensor system for an aircraft, comprising:

an elastomer panel covering a portion of the exterior of the aircraft;

an electronic pressure sensor encased in an elastic sheet of the elastomer panel; and an electronic processing circuit coupled to the electronic pressure sensor, wherein the electronic processing circuit can determine an outside air pressure that is indicative of an airspeed of the aircraft.

9. The sensor system of claim 8, wherein the electronic pressure sensor is a poly vinylidine flouride sensor.

10. The sensor system of claim 8, further including a temperature sensor near the electronic pressure sensor and coupled to the electronic processing circuit.

11. The sensor system of claim 8, further including an optical strain sensor embedded in the elastic sheet.

12. The sensor system of claim 11, wherein the optical strain sensor is coupled to the electronic processing system.

13. The sensor system of claim 12, wherein the optical fiber is made of the same material as the elastic sheet.

14. The sensor system of claim 12, further including a detector at the output of a interferometer, the detector coupled to the electronic processing circuit.

15. The sensor system of claim 14, wherein the elastomer panel has a reinforcing member.

16. The sensor system of claim 15, further including a crack wire deposited on the reinforcing member, the crack wire electrically coupled to the electronic processing circuit.

17. The sensor system of claim 16, wherein the electronic processing circuit can correlate a measured strain from the strain sensor to a shape of the elastomer panel.

18. A sensor system for an elastomer panel, comprising:

a plurality of piezoelectric transducers embedded in an elastic skin of the elastomer panel; and a processor electrically coupled to the plurality of piezoelectric transducers and receiving a pressure signal from each of the plurality of piezoelectric transducers, wherein the electronic processing circuit can determine an outside air pressure that is indicative of an airspeed.

19. The sensor system of claim 18, further including a plurality of reinforcing rods inside the elastomer panel, a crack wire deposited on each of the plurality of reinforcing rods.

20. The sensor system of claim 18, further including a plurality of optical strain sensors embedded in the elastic skin.

21. The sensor system of claim 20, further including an optical strain processor coupled to each of the optical strain sensors.

* * * * *

UNITED STATES PATENT AND TRADEMARK OFFICE
CERTIFICATE OF CORRECTION

PATENT NO. : 5,896,191
DATED : April 20, 1999
INVENTOR(S) : T. Beier *et al.*

It is certified that error appears in the above-identified patent and that said Letters Patent is hereby corrected as shown below:

Title page, block [75] Inventors
Add - -Cynthia Ann Gruenselder, St. Louis, MO- -

Signed and Sealed this

First Day of May, 2001

*Attest:*

NICHOLAS P. GODICI

*Attesting Officer*   *Acting Director of the United States Patent and Trademark Office*